US012699029B2

(12) United States Patent
Jones et al.

(10) Patent No.: US 12,699,029 B2
(45) Date of Patent: Aug. 4, 2026

(54) SPECTROSCOPIC MONITORING SYSTEM FOR A CARBON CAPTURE USE AND STORAGE PIPELINE

(71) Applicant: Halliburton Energy Services, Inc., Houston, TX (US)

(72) Inventors: Christopher Michael Jones, Katy, TX (US); Elena Valerievna Fokina, Aberdeen (GB); Iain J. Shepherd, Aberdeen (GB); Graham Jack, Newburgh (GB)

(73) Assignee: Halliburton Energy Services, Inc., Houston, TX (US)

( * ) Notice: Subject to any disclaimer, the term of this patent is extended or adjusted under 35 U.S.C. 154(b) by 733 days.

(21) Appl. No.: 18/148,785

(22) Filed: Dec. 30, 2022

(65) Prior Publication Data

US 2024/0219274 A1 Jul. 4, 2024

(51) Int. Cl.
*G01N 1/38* (2006.01)
*F17D 5/00* (2006.01)
*G01N 1/22* (2006.01)
*G01N 21/31* (2006.01)

(52) U.S. Cl.
CPC .............. *G01N 1/38* (2013.01); *F17D 5/005* (2013.01); *G01N 1/2202* (2013.01); *G01N 1/2247* (2013.01); *G01N 21/31* (2013.01); *G01N 2001/2264* (2013.01); *G01N 2001/386* (2013.01)

(58) Field of Classification Search
None
See application file for complete search history.

(56) References Cited

U.S. PATENT DOCUMENTS

| | | | | |
|---|---|---|---|---|
| 5,397,989 A | * | 3/1995 | Spraul | G01R 33/307 |
| | | | | 324/318 |
| 5,482,063 A | * | 1/1996 | Miura | B08B 9/0936 |
| | | | | 91/2 |
| 6,686,594 B2 | * | 2/2004 | Ji | G01N 21/33 |
| | | | | 250/372 |
| 9,797,822 B2 | * | 10/2017 | Little, III | G01N 7/14 |
| 2002/0048818 A1 | * | 4/2002 | Sakairi | G01N 1/2258 |
| | | | | 422/78 |
| 2017/0248568 A1 | * | 8/2017 | Yizhack | G01N 21/3577 |
| 2019/0257744 A1 | * | 8/2019 | Cerrone | G01N 1/2247 |

FOREIGN PATENT DOCUMENTS

| | | | | | |
|---|---|---|---|---|---|
| CN | 207237745 U | * | 4/2018 | | |
| CN | 207287048 U | * | 5/2018 | | |
| CN | 113784776 A | * | 12/2021 | ....... | B01J 20/28078 |
| JP | 2002505421 A | * | 2/2002 | .......... | G01N 1/2035 |
| WO | WO-2006138632 A2 | * | 12/2006 | .......... | E21B 49/005 |

* cited by examiner

*Primary Examiner* — Daniel S Larkin
(74) *Attorney, Agent, or Firm* — Kilpatrick Townsend & Stockton LLP

(57) ABSTRACT

A monitoring system for monitoring a pipeline can include a sampling unit, a spectroscopy system, and a waste handling system. The sampling unit can include a sampling point for capturing a representative sample of a fluid flow in the pipeline. The spectroscopy system can be configured to chemically analyze the representative sample with respect to components of the fluid flow. Additionally, the spectroscopy system can be configured to detect a corrosive component of the fluid flow. The waste handling system can remove the representative sample from the spectroscopy system.

19 Claims, 9 Drawing Sheets

800

802
Capture a representative sample of a fluid flow at a sampling point of a pipeline

804
Prepare the representative sample for chemical analysis

806
Analyze the representative sample to detect corrosive components of the fluid flow

808
Remove the representative sample from the spectroscopy system subsequent to analyzing the representative sample

900

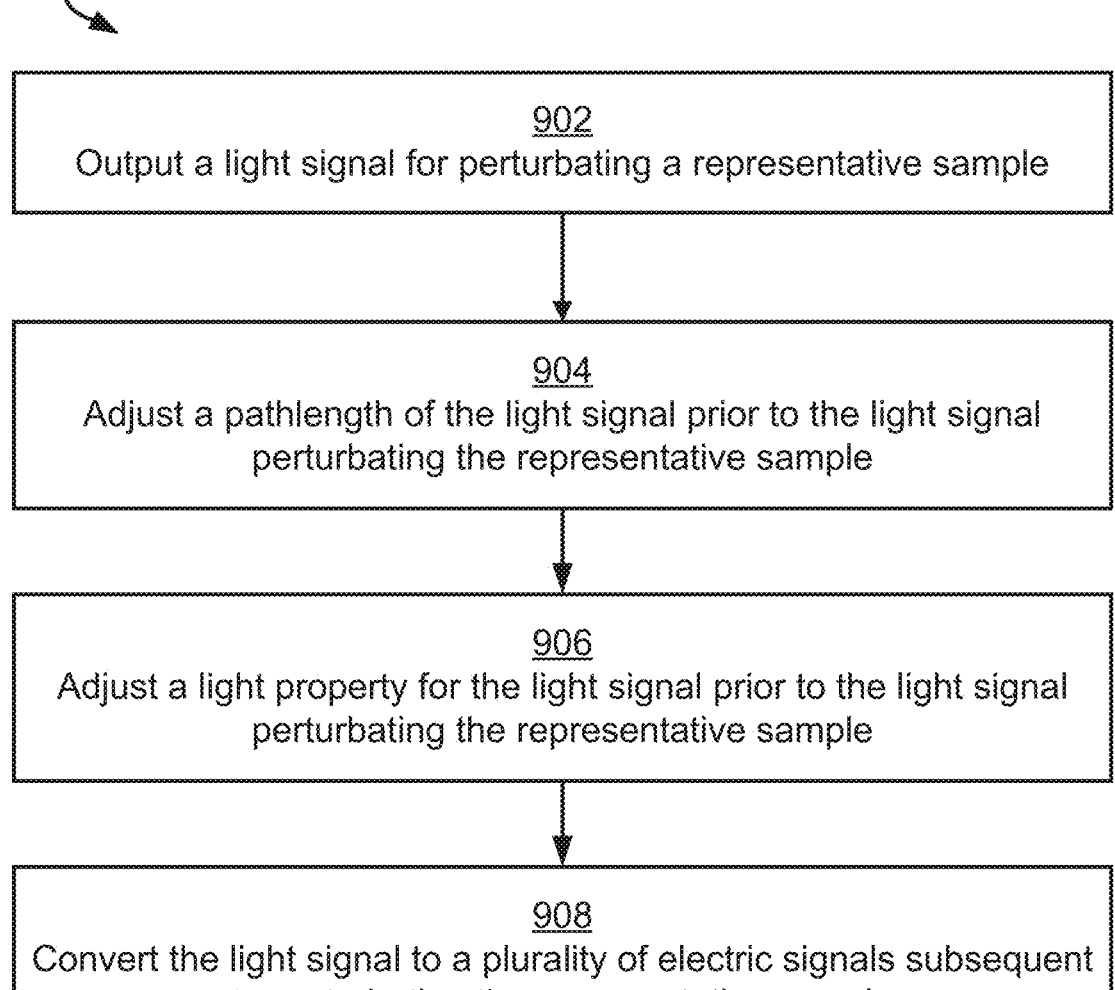

902
Output a light signal for perturbating a representative sample

904
Adjust a pathlength of the light signal prior to the light signal perturbating the representative sample

906
Adjust a light property for the light signal prior to the light signal perturbating the representative sample

908
Convert the light signal to a plurality of electric signals subsequent to perturbating the representative sample

910
Adjust a sampling condition for the sampling unit in response to receiving electric signals from a detector

*FIG. 9*

SPECTROSCOPIC MONITORING SYSTEM FOR A CARBON CAPTURE USE AND STORAGE PIPELINE

TECHNICAL FIELD

The present disclosure relates generally to pipeline operations and, more particularly (although not necessarily exclusively), to a spectroscopic monitoring system for a carbon capture use and storage (CCUS) pipeline.

BACKGROUND

Carbon capture use and storage (CCUS) can involve capturing carbon dioxide emissions from industrial processes, such as wellbore operations, and storing the carbon dioxide emissions in subterranean formations. Additionally or alternatively, the carbon dioxide emissions can be captured from the industrial processes and recycled back into the industrial processes. Impurities in gases, such as sulfur dioxide, that are captured with the carbon dioxide emissions can cause corrosion, degradation, or other hazards in CCUS pipelines. Corroded pipes can become brittle and can accumulate cracks that can lead to burst pipes or other hazards.

Optical spectroscopy can be used to identify molecules using an interaction between electromagnetic radiation and the molecules as a function of the wavelength or frequency of the electromagnetic radiation. An optical spectrometer can measure light properties, such as intensity, over a specific portion of an electromagnetic spectrum to identify the molecules.

BRIEF DESCRIPTION OF THE DRAWINGS

FIG. 9 is a flowchart of a process for chemically analyzing a representative sample from a pipeline using a monitoring system according to one example of the present disclosure.

DETAILED DESCRIPTION

Figure 1:
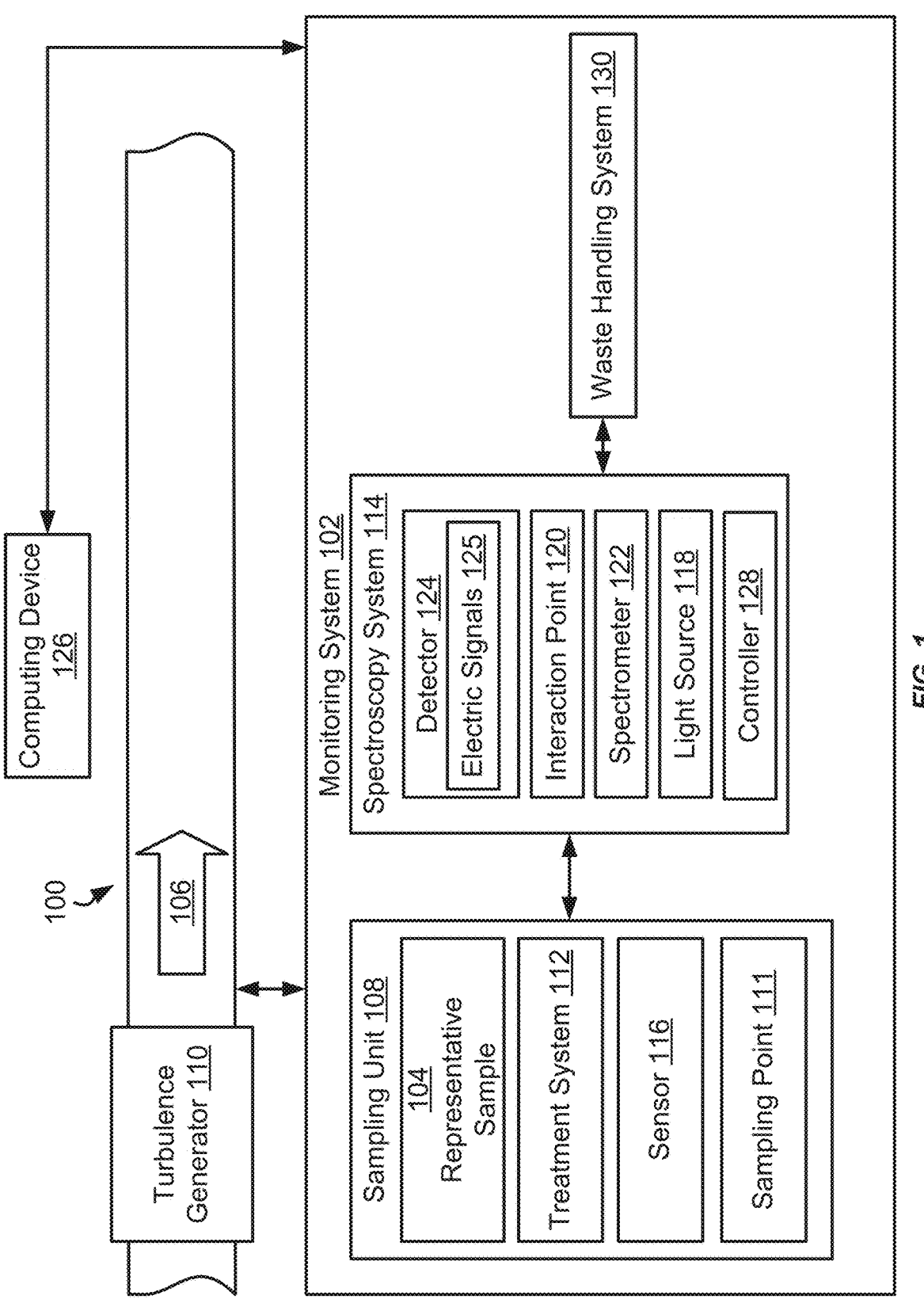
FIG. 1 is an example of a pipeline with a monitoring system according to one example of the present disclosure.

Certain aspects and examples of the present disclosure relate to a monitoring system that monitors corrosive components in fluid flow of pipelines using spectroscopy. The monitoring system can include a sampling unit, a spectroscopy system, a waste handling system, or a combination thereof. The sampling unit can include a sampling point to capture a representative sample of the fluid flow in a carbon capture use and storage (CCUS) pipeline, also referred to herein as a pipeline. Additionally, the sampling unit can include a treatment system that adjusts a physical property of the representative sample. The spectroscopy system can receive the representative sample from the sampling unit and can chemically analyze the representative sample to determine components of the fluid flow in the pipeline. The components can include one or more corrosive components that may cause corrosion in the pipeline. Based on chemical analysis of the representative sample by the spectroscopy system, the sampling unit can adjust a sampling condition for the representative sample. The sampling condition for the representative sample can be adjusted to pinpoint a specific component, such as the corrosive components, of the components in the fluid flow. After the representative sample is chemically analyzed, the waste handling system can receive the representative sample from the spectroscopy system to safely remove the representative sample from the monitoring system. For example, the waste handling system may remove the representative sample in accordance with government rules or regulations.

Implementing the monitoring system for the CCUS pipeline can enable real-time monitoring of the CCUS pipeline to determine a composition of the fluid flow. For example, the fluid flow may include carbon dioxide, water, hydrocarbons or other impurities that can cause corrosion or other suitable deterioration in the CCUS pipeline. The monitoring system can increase efficiency in monitoring the composition of the fluid flow by implementing the spectroscopy system onsite such that the representative sample can be analyzed relatively quickly. For example, traditional lab testing may take several days or weeks to transport the representative sample to a lab prior to analyzing the representative sample, whereas the onsite monitoring system may analyze the representative sample in a few minutes or hours. A relatively quick analysis of the representative sample can facilitate applying remediation for corrosive components in a timely manner. Additionally, using the waste handling system in the monitoring system to remove the representative sample from the monitoring system can minimize a likelihood of releasing hazardous compounds to an area adjacent to the CCUS pipeline. The waste handling system can neutralize the representative sample prior to transporting the representative sample, minimizing risks associated with releasing the representative sample during storage or transport.

Due to multiple phases or separation of the components in the fluid flow, a turbulence generator can be positioned upstream from the monitoring system to mix the fluid flow prior to sampling. The turbulence can ensure that a sample of the fluid flow would be representative of all components in the fluid flow. After the fluid flow is mixed, the sampling unit of the monitoring system can collect the representative sample from the fluid flow from one or more sampling units in the pipeline. In examples with more than one sampling point, a sample from each sampling point can be combined to form the representative sample. Alternatively, each sample can be analyzed separately by the spectroscopy system or multiple systems associated with monitoring the CCUS pipeline.

Before the spectroscopy system chemically analyzes the representative sample, the treatment system in the spectroscopy system can adjust the physical property (e.g., phase, temperature, or concentration) of the representative sample. For example, the treatment system can flash the representative sample from a liquid state to a gas state. Adjusting the physical property can enable relatively clear results from the spectroscopy system. A sensor can be positioned in the sampling unit to collect physical property data with respect to the representative sample.

The spectroscopy system can include an interaction point, a perturbation technique, and a detection technique. The interaction point can be a location at which the representative sample is perturbed using the perturbation technique, such as optical absorbance from a light source. Other perturbation techniques may be scattering, fluorescence, or other suitable techniques to change the energy state(s) of the representative sample under analysis. The representative sample can be referred to as an analyte. Although the monitoring system is described as implementing absorbance as the perturbation technique, other suitable perturbation techniques may be substituted for absorbance. The light source can output a light signal to perturb the representative sample at the interaction point such that the optical absorbance with respect to the representative sample can be analyzed. Before the light source is modified to induce perturbations, the interaction point can adjust a pathlength of the light signal to enhance a specific absorption wavelength relative to other absorption wavelengths. After receiving the light signal from the perturbed representative sample, a detector in the spectroscopy system can implement the detection technique, such as intensity detection as a function of wavelength. Although the monitoring system is primarily described as an optical spectroscopy system, the monitoring system may involve other analytical techniques, such as mass spectroscopy, NMR analysis, acoustic analysis, ultrasonic analysis, or the like. A controller may be included in the spectroscopy system to apply adjustments to analyzing the representative sample by using feedback control. In such non-optical spectroscopic systems, using perturbation detection can still be applicable. For example, the representative sample may be perturbed by ion fragmentation and subsequent magnetic flux as in mass spectroscopy, followed by a current detection. Additionally or alternatively, the representative sample may be perturbed by interaction with a stationary phase followed by thermal conductivity detection or flame ionization detection. A spectrum generated by any such technique can provide a measurement of a magnitude of a perturbation effect on the analyte as a function of changing properties of the perturbation technique. This may be measurement of the absorbance of light from the light source as a function of a wavelength of the light.

After the representative sample is chemically analyzed, the waste handling system can remove the representative sample from the monitoring system. The representative sample can be referred to as a waste sample after being chemically analyzed. In some examples, the waste handling system may treat the waste sample in order to remove a portion of the waste sample. For example, the waste handling system may remove toxic portions of the waste sample, environmentally sensitive portions of the waste sample, or elements of the waste sample to make the waste sample safer to store, transport, or handle. Chemical consumables (e.g., preparation reagents or chemical indicators) that have passed through the monitoring system may be removed by the waste handling system. Chemical waste can describe the representative sample, the chemical consumables, or a combination thereof. The waste handling system can responsibly handle the chemical waste, such as in accordance with environmental regulations, to minimize harm to humans or an environment adjacent to the waste handling system. The waste handling system may recycle in part at least a portion of the chemical waste in order to reinject the portion of the chemical waste into the pipeline stream or use separated components of the chemical waste for further analysis.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is an example of a pipeline 100 with a monitoring system 102 according to one example of the present disclosure. The pipeline 100 can be a carbon capture use and storage (CCUS) pipeline. The monitoring system 102 can collect a representative sample 104 from a fluid flow 106 in the pipeline 100 using a sampling unit 108 in the monitoring system 102.

In some examples, the components of the fluid flow 106 can separate based on physical properties, such as density, viscosity, or the like. For example, a first component in a first phase with a lower density than a second component in a second phase may move to a bottom portion of the pipeline due to gravity segregation. Additionally or alternatively, a third component in a third phase with a lower viscosity than the second component may move to a central portion of the pipe. Inhomogeneous flow in the pipeline 100 can include multiple phases in the fluid flow 106. For example, the inhomogeneous flow may include two-phase flow, where a liquid phase and a gaseous phase are both present in the fluid flow 106. Additionally or alternatively, the inhomogeneous flow can include at least two immiscible fluids or at least two partially miscible fluids.

Prior to the sampling unit 108 collecting the representative sample 104, a turbulence generator 110 coupled to the pipeline 100 can generate turbulence to mix the fluid flow 106. The turbulence can be generated through a pressure change caused by the turbulence generator 110. The turbulence generator 110 can be positioned upstream from the monitoring system 102 to ensure the sampling unit 108 collects the representative sample 104 after the fluid flow 106 is relatively homogeneous. The turbulence generator 110 can be a non-invasive turbulence generator, an invasive turbulence generator, or a combination thereof.

Figure 2:
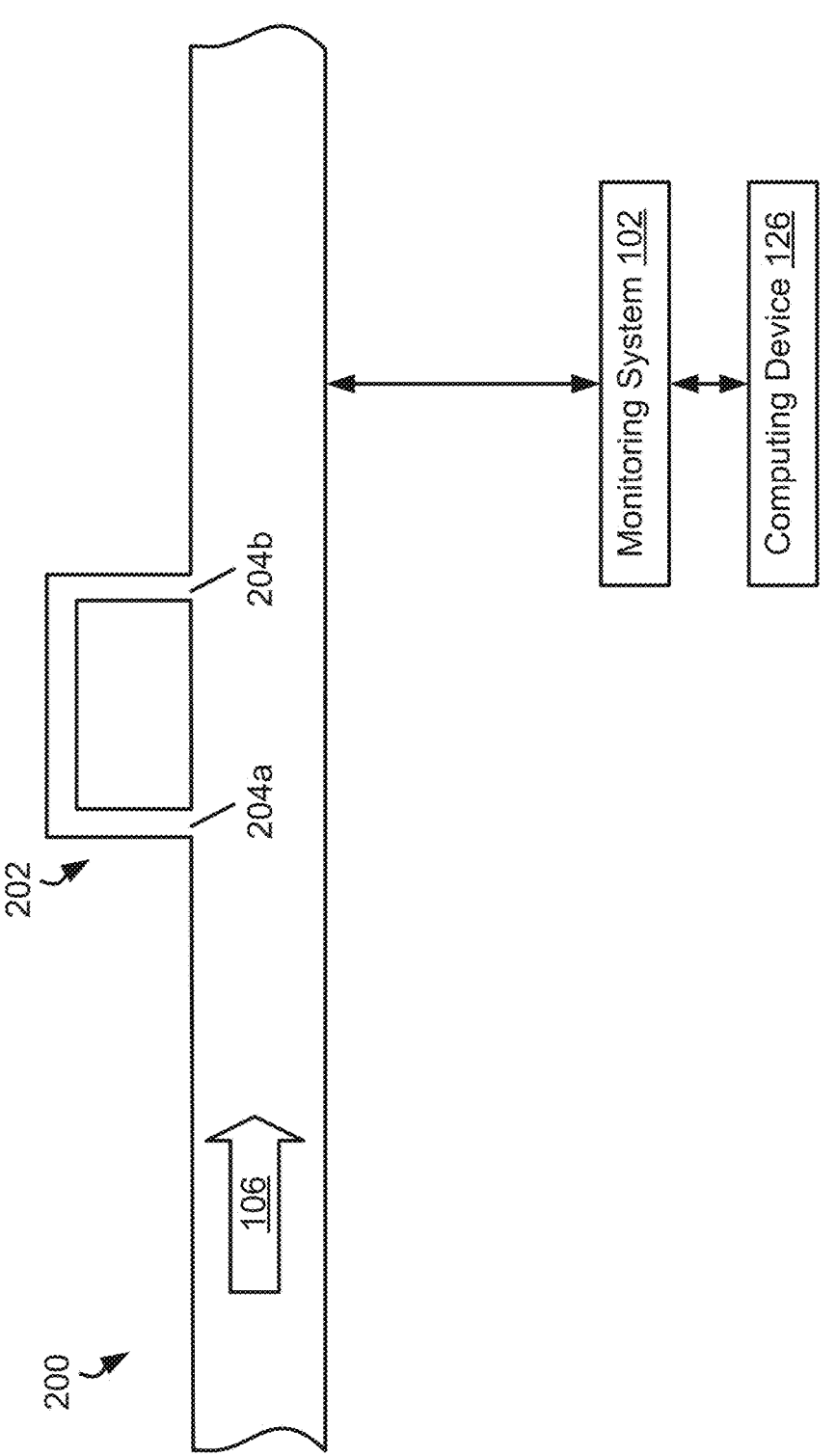
FIG. 2 is an example of a pipeline with a monitoring system and a non-invasive turbulence generator according to one example of the present disclosure.

A non-invasive turbulence generator can be positioned external to the fluid flow 106 through the pipeline 100. For example, referring to FIG. 2, the non-invasive turbulent generator is depicted as a side arm 202 that opens a pipeline 200 to a flow path defined by the side arm 202. The side arm 202 can include a first opening 204a at a first point in the pipeline 200 and a second opening 204b at a second point in the pipeline 200. The second point can be positioned at a predetermined distance away from the first point. The predetermined distance can be determined based on an amount of turbulence needed to mix the fluid flow 106. A portion of the fluid flow 106 moving through the pipeline 200 can enter the side arm 202 through the first opening 204a and can rejoin the fluid flow 106 at the second opening 204b. As a result, pressure for the fluid flow 106 can drop as the fluid flow 106 moves past the first opening 204a of the side arm 202. The decrease in the pressure for the fluid flow 106 can generate turbulence to mix the fluid flow 106.

A size for the first opening 204a and the second opening 204b can be dynamically adjusted or pre-adjusted with respect to a predetermined flow composition, a predetermined pipeline configuration, or a combination thereof, to adjust the turbulence of the fluid flow 106. The predetermined flow composition can refer to a measured flow composition or an inferred flow composition. For example, the side arm 202 can be adjusted with a first set of suitable pipeline devices, such as a valve or an orifice, to tune the turbulence for a compositional change in the fluid flow 106. The valve or another suitable pipeline device additionally can be used to tune the turbulence to meet a predetermined mixing threshold for the fluid flow 106. Additionally, more than one side arm 202 can be included to adjust turbulence in the fluid flow 106. In some examples, adjustment of the first opening 204a or the second opening 204b can be controlled by the computing device 126. The turbulence or sampling homogeneity obtained by a sampling unit (e.g., the sampling unit 108 of FIG. 1) may be monitored as feedback to control the monitoring system 102. Homogeneity of the representative sample may, for instance be analyzed by a time variation of any suitable analyte measurement obtained by the sampling unit. The turbulence in the pipeline 200 may be directly measured including, but not limited to, based on pressure differential as a function of distance in the pipeline 200.

Figure 3:
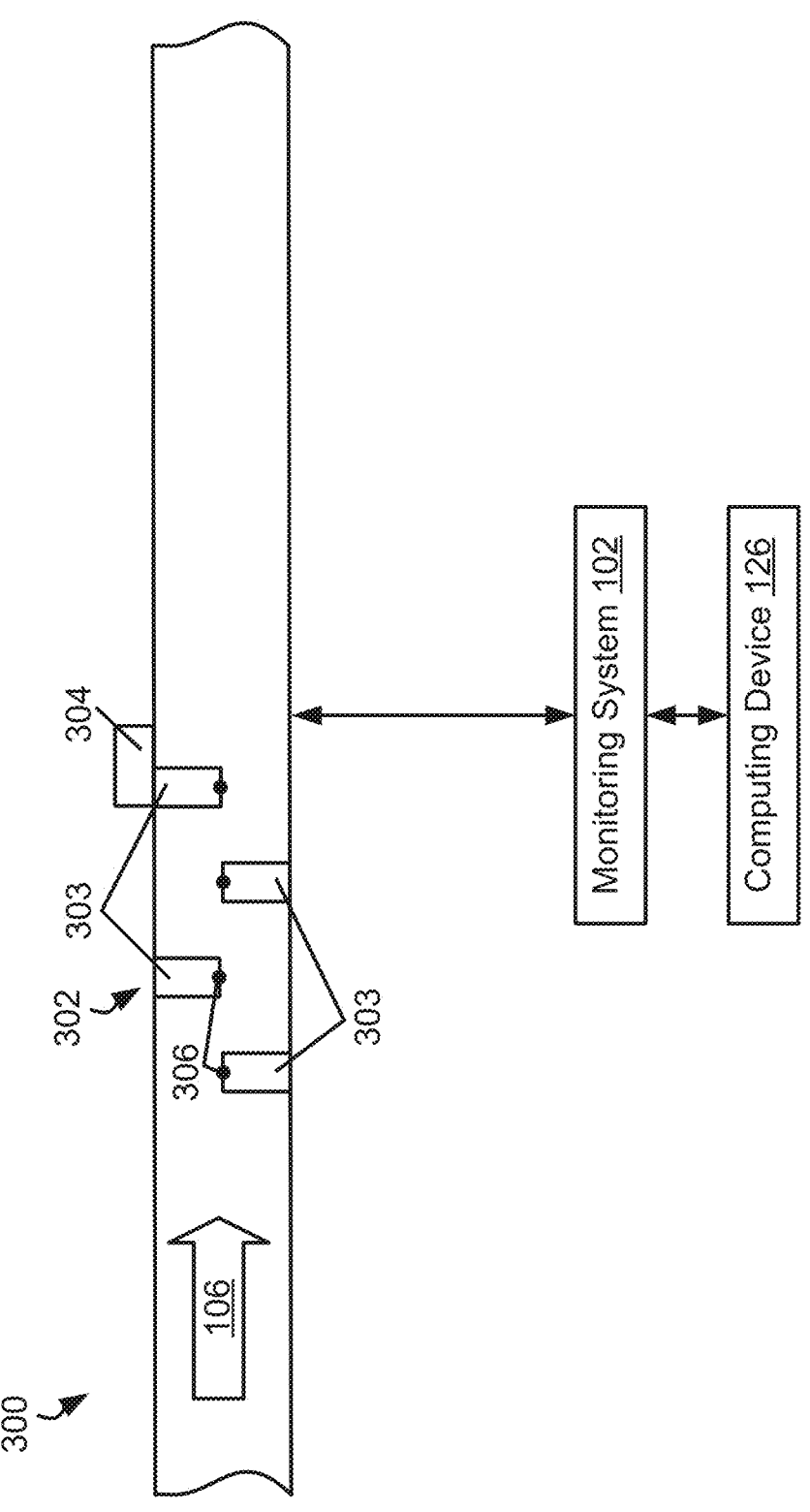
FIG. 3 is an example of a pipeline with a monitoring system and an invasive turbulence generator according to one example of the present disclosure.

In contrast to the non-invasive turbulence generator, an invasive turbulence generator can be positioned such that the invasive turbulence generator inhibits the fluid flow 106. For example, referring to FIG. 3, the invasive turbulence generator 302 can include one or more physical obstructions 303 within the pipeline 300 to generate increased turbulence. Although fins are depicted in FIG. 3 as the invasive turbulence generator 302, other examples of the physical obstructions 303 implemented as the invasive turbulence generator 302 can include mesh, rods, or blades. The physical obstructions 303 can impede the fluid flow 106. For example, as the fluid flow 106 passes the physical obstructions 303, the fluid flow 106 can experience a pressure drop behind the physical obstructions 303. As a result, eddies can form in the fluid flow 106 after contacting the physical obstructions 303, thereby generating turbulence in the fluid flow 106. Dynamic turbulence generators may also be controlled by feedback via direct turbulence measurements or homogeneity of the representative sample.

The invasive turbulent generator 302 being present in the pipeline may decrease an accuracy of an inspection device. As a result, the invasive turbulent generator 302 may retract from the fluid flow while the inspection device is in use in the pipeline 300. For example, the invasive turbulent generator 302 can retract into a recess 304 defined by the exterior of the pipeline 300 before the inspection device, such as a pig, is transported through the pipeline 300. The invasive turbulence generator 302 may include a hinge or another suitable connector by which the invasive turbulence generator 302 is connected to the recess 304. The inspection device can be used to examine the pipeline 300 for corrosion, fractures, or other suitable degradation in the pipeline 300. In some examples, retraction of the invasive turbulent generator 302 can be caused by a signal transmitted from the computing device 126.

Separation of multiple components in the inhomogeneous flow can prohibit obtaining the representative sample 104 prior to mixing the fluid flow 106. Homogenizing the fluid flow 106 can involve mixing multiple phases in the fluid flow 106 such that a representative composition for the fluid flow 106 may be collected at a sampling point 306 over a predetermined amount of time, such as minutes or hours. In some examples, a sampling point 306 coupled to a sampling unit (e.g., the sampling unit 108 of FIG. 1) can be positioned in the invasive turbulence generator 302. For example, the sampling point may be positioned at a tip, a side, or another suitable location of the invasive turbulence generator 302. When the invasive turbulence generator 302 contacts the fluid flow 106 to generate turbulence, the sampling point can collect the representative sample 104. In examples in which more than one physical obstruction 303 is implemented as the invasive turbulence generator 302, at least one physical obstruction 303 may include an individual sampling point. Each fluid sample collected at the various sampling points can be combined in the sampling unit to generate the representative sample 104.

Returning to FIG. 1, the representative sample 104 can be collected at a sampling point 111 associated with the sampling unit 108. In some examples, the sampling point 111 can be implemented in combination with the turbulence generator 110, as described below in FIG. 3. In other examples, the sampling point 111 may be positioned external to the sampling unit 108. For example, the sampling point 111 can be positioned within or along an exterior of the pipeline 100. More than one sampling point 111 can be positioned with respect to the exterior of the pipeline 100 to ensure a diversity of locations from which to sample the fluid flow 106. Each fluid sample from each sampling point 111 can be combined to generate the representative sample 104. Alternatively, each fluid sample can be analyzed separately, either on the same spectroscopy system 114 or separate analysis systems. A location for each sampling point 111 may be radially adjusted with respect to a flow direction of the fluid flow 106, longitudinally adjusted with respect to the flow direction, or a combination thereof.

After collecting the representative sample 104, a treatment system 112 in the sampling unit 108 can prepare the representative sample 104 for chemical analysis. For example, one or more physical properties of the representative sample 104 can be adjusted to improve a spectroscopic analysis from a spectroscopy system 114. In examples in which the physical properties include temperature, the treatment system 112 can heat the representative sample 104 to flash the representative sample 104. Flashing the representative sample 104 can change it from a liquid state to a vapor state. In some examples, the representative sample 104 may be analyzed in the liquid state. Compared to the liquid state, the vapor (gas) state can provide less sample matrix effects for analysis. A total pressure associated with the representative sample 104 may be above atmospheric pressure or below atmospheric pressure including relatively low pressure such as milli-torr or micro-torr. The sampling unit 108 can include at least one sensor 116 to detect the physical properties of the representative sample 104. In some examples, the sensor 116 can be coupled to the sampling point 111. Additional examples of adjustments to the representative sample 104 can include diluting the representative sample 104, separating the representative sample 104 into separate components, or other suitable methods associated with preparing the representative sample 104 for analysis.

The sampling unit 108 can transport the representative sample 104 to the spectroscopy system 114 in the monitoring system 102. The spectroscopy system 114 can chemically analyze the representative sample 104. The spectroscopy system 114 can include a light source 118 to generate a light signal that perturbates the representative sample 104. An interaction point 120 can be positioned in the spectroscopy system 114 to adjust a pathlength for the light signal. Adjusting the pathlength for the light signal may affect collimation of the light signal. A spectrometer 122 in the spectroscopy system 114 may adjust a light property of the light signal. Examples of the light property can include wavelength, intensity, frequency, or the like. In some examples, the spectrometer 122 can adjust the light property without affecting the collimation of the light signal.

After the light signal perturbates the representative sample 104, a detector 124 in the spectroscopy system 114 can receive the light signal and can convert the light signal into electric signals 125. The electric signals 125 can be transmitted to the computing device 126 that is communicatively coupled with the monitoring system 102. The computing device 126 can interpret the electric signals 125 to obtain information regarding the representative sample 104. In some examples, the electric signals 125 can be outputted to a converter that converts the electric signals 125 from analog signals to digital signals. The computing device 126 may generate a plot of a spectrum associated with the representative sample 104 using the electric signals 125 received from the detector 124. As described herein, the plot does not mean to imply a limiting graphical representation, whether electronic or not. Additionally or alternatively, the computing device 126 can generate an equivalent array, matrix, mathematical representation, or digital representation of the spectrum. The plot of the spectrum can include an absolute scale or a relative scale for the spectrum. Additionally or alternatively, the computing device 126 can generate an adjustment for one or more components, such as the spectroscopy system, of the monitoring system 102. In some instances, the adjustment can be applied to implement remediation in the pipeline 100. In other examples, the adjustment can cause the treatment system 112 of the sampling unit 108 to adjust the physical properties of the representative sample 104.

After being chemically analyzed by the spectroscopy system 114, the representative sample 104 can be transported to a waste handling system 130 in the monitoring system 102. The waste handling system 130 may be located onsite with the sampling unit 108 and the spectroscopy system 114. The representative sample 104 can be combined with other chemical compounds used in the monitoring system 102 to form chemical waste. In some examples, the waste handling system can remediate the chemical waste before disposing the chemical waste. Additionally, the waste handling system can separate hazardous compounds in the chemical waste from benign compounds before remediating the chemical waste. The hazardous compounds can be neutralized, while the benign compounds may be released to a surrounding environment, such as atmosphere. Additionally or alternatively, the benign compounds can be captured or recycled by other means.

Figure 4:
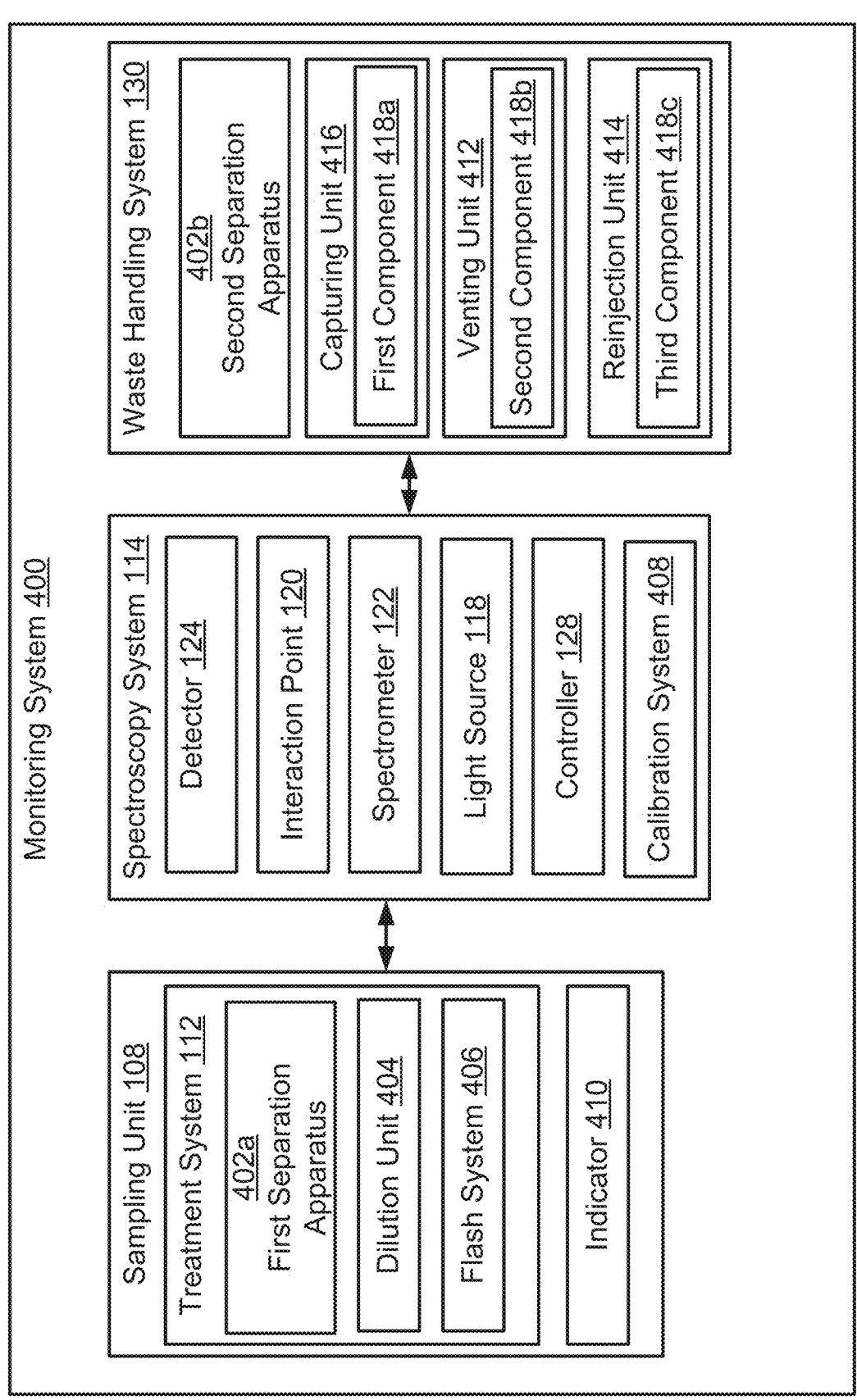
FIG. 4 is a block diagram of a monitoring system for a pipeline according to one example of the present disclosure.

FIG. 4 is a block diagram of a monitoring system 400 for a pipeline (e.g., the pipeline 100 of FIG. 1) according to one example of the present disclosure. The monitoring system 400 can be implemented for monitoring a CCUS pipeline. A fluid flow (e.g., the fluid flow 106 of FIG. 1) can include one or more chemical compounds in liquid phase or gas phase. Components of the monitoring system 400 can include the sampling unit 108, the spectroscopy system 114, the waste handling system 130, or a combination thereof.

The representative sample 104 can be collected by the sampling unit 108 using a sampling point (e.g., the sampling point 306 of FIG. 3). The sampling unit 108 can include a treatment system 112 that prepares the representative sample 104 before the spectroscopy system 114 chemically analyzes the representative sample 104. The treatment system 112 can prepare the representative sample 104 by adjusting a physical property of the representative sample 104.

In some examples, the treatment system 112 can include a first separation apparatus 402a that separates the representative sample into components. The first separation apparatus 402a can be positioned to separate the representative sample prior to the representative sample entering the treatment system 112. Additionally or alternatively, the first separation apparatus 402a can separate the representative sample prior to the representative sample being received by the spectroscopy system 114. The first separation apparatus 402a may apply at least one separation method to separate the representative sample into the components. An example of the separation method implemented by the first separation apparatus 402a can include adsorption, which involves an adhesion of particles to a surface. Specifically, separating the representative sample using adsorption can be implemented through using differential adsorption onto a filter substrate or an extended path. Examples of the filter substrate can include activated carbon, zeolite, or other suitable adsorbents. The extended path may be accomplished by tubing, a microfluidic device, or a tortuous path. Components of the representative sample that are captured by the filter substrate can be released by an activation mechanism, such as heating the filter substrate or path material of the extended path.

An additional example of the separation method can include using cryogenic means to separate the representative sample into the components. The cryogenic means can include lowering a temperature for the representative sample below a freezing point for at least one component in the representative sample. For example, water may be an interferent for hydrogen sulfide and can be removed cryogenically through freezing the water at a first temperature. The temperature can be at or below $0°$ C. $(32°$ F.) such that the hydrogen sulfide remains in a vapor phase.

Additionally or alternatively, the treatment system 112 can include a dilution unit 404. Adjusting concentration of the components in the representative sample can provide increased sensitivity to an analyte. In some examples, the dilution unit 404 can remove interfering components from the representative sample. For example, water can be an interferent with respect to detecting hydrogen sulfide. By removing the water from the representative sample, the dilution unit 404 can generate a more concentrated representative sample. The spectroscopy system 114 can better analyze the more concentrated representative sample for hydrogen sulfide compared to the representative sample. The representative sample may also be analyzed using a difference between an upstream concentration and a downstream concentration with respect to a retaining material. Additionally or alternatively, the representative sample may be analyzed while temporarily retained by the retaining material and then released.

The dilution unit 404 can adjust a concentration for the components of the representative sample individually or batchwise. Diluting the representative sample can involve adding the representative sample to a container of inert gas, such as helium, nitrogen, or the like. Additionally or alternatively, the representative sample can be diluted using air, which typically includes nitrogen and oxygen. In some examples, a generator, such as a nitrogen generator or a hydrogen generator, can be used to dilute the representative sample. In some examples, varying dilutions may provide suitable analysis for different components in the representative sample.

The treatment system 112 additionally or alternatively can include a flash system 406. Sample analysis can be more sensitive or selective when the representative sample is in the gas phase. A flash system may, in some examples, be used to break down, decompose, or break apart molecules to yield analyzable products. Such a flash system may include oxygen or other suitable reagents to convert the analyte into a relatively more analyzable form. In some examples, the fluid flow can already be in the gas phase, whereas in other examples, the fluid flow can be in the liquid phase. A combination of gas and liquid as two-phase flow can occur in the fluid flow as well. The flash system 406 can convert the representative sample from a liquid phase to a gas phase by reducing pressure. For example, the flash system 406 can expand relatively small amounts of the representative sample in the liquid phase into relatively low pressure. The relatively low pressure may be near atmospheric pressure compared to pressure in the pipeline. In some examples, the relatively low pressure may be much lower than atmospheric, such as torr, mili-torr, or micro-torr above atmospheric pressure and below pipeline pressure. Alternatively, the flash system 406 can expand the representative sample into vacuum pressure, which is lower than atmospheric pressure. Additionally, or alternatively, the flash system 406 may contain a heated section to convert the representative sample from the liquid phase to the gas phase.

To analyze the representative sample, the spectroscopy system 114 can use optical spectroscopy, mass spectroscopy, chromatography, electromagnetic analysis, nuclear magnetic resonance (NMR) analysis, X-ray analysis, acoustic analysis, ultrasonic analysis, or a combination thereof. Analyzing the representative sample can involve an interaction point 120, a perturbation technique, and a detection technique. In some examples, the spectroscopy system 114 may experience changes in system behavior over time, which can be referred to as drift. A calibration system 408 in the spectroscopy system 114 can be used to detect drift. Drift in the spectroscopy system 114 can cause inaccurate readings, decrease measurement reproducibility, decrease sensor sensitivity, or a combination thereof. A level of the drift in the spectroscopy system 114 can be checked using a reference check, which may include a standard or a blank. In some examples, the reference check can be conducted after detecting that operational parameters for the spectroscopy system 114 have exceeded a predefined threshold, such as a predefined tolerance. For example, the operational parameters may have drifted beyond the predefined tolerance for a voltage, a current, a temperature, or the like. The predefined threshold additionally or alternatively may be associated with an expected range for a spectroscopic analysis. For example, exceeding the expected range may involve more than one hundred percent total analyte detection. Alternatively, the drift in the spectroscopy system 114 may be detected due to the operational parameters being outside the predefined threshold.

After detecting drift, the calibration system 408 can calibrate the spectroscopy system 114 through empirical methods, statistical methods, or physics-based methods. Calibrating the spectroscopy system 114 can involve optical path adjustment or spectrometer adjustment. Additionally or alternatively, calibrating the spectroscopy system 114 can involve replacing one or more components in the spectroscopy system 114, such as a light source 118, a detector 124, or another suitable component.

In examples in which the spectroscopy system 114 uses optical spectroscopy, the interaction point 120 can be an optical cell. The perturbation technique can be optical absorbance from the light source 118, while the detection technique can be intensity detection as a function of wavelength. The light source 118 can output a light signal to perturbate the representative sample. In some examples, the light source 118 can adjust a power of the light signal to avoid saturating the detector 124 with respect to an optical density of the representative sample. The optical cell can adjust a pathlength for the light signal to tune the light signal by changing an angle through the optical cell. Additionally or alternatively, the pathlength of the light signal can be adjusted by changing a window position or mirror position in the optical cell or changing a number of internal reflections in the optical cell. Adjusting the pathlength can affect the light signal nonlinearly as a function of adsorption.

An indicator 410, such as a coulometric indicator, can be injected into the pipeline or into the sampling unit 108. In some examples, the indicator 410 may be a reversible indicator. The reversible indicator can be bound to a substrate, such as a window, in the interaction point 120. The indicator 410 can adjust physical properties, such as optical response or concentration as a function of pipeline condition, of the representative sample 104. Additionally, the indicator 410 may show a presence of specific analytes or physical conditions, such as temperature, pressure, corrosion potential, active corrosion, or the like, associated with the fluid flow. For example, the indicator 410 can indicate the presence of active corrosion through a molecule that adsorbs to a metal oxide. The molecule can be reduced in concentration because of the metal oxide being present in the pipeline, thereby indicating the presence of active corrosion.

An additional example can include the indicator 410 changing its wavelength of absorption after contacting an acid. In this example, the indicator 410 can function as a pH indicator. In other examples, the indicator 410 may indicate a presence of a specific analyte. For example, a yellow hue of gold can be reduced as mercury adsorbs. Additionally or alternatively, florescence quenching can be implemented by the indicator 410 such that the indicator 410 quenches the florescence of a specific component in the representative sample. A reference fluorescent measurement may be made with the indicator 410. Alternatively, the reference fluorescent measurement can be implemented while the indicator 410 is absent from the fluid flow or representative sample 104. In some examples, the indicator 410 may further be bonded or contained within an immobile permeable substrate in order to retain the indicator 410 for more than one use. Such an immobile substrate would, for instance, be located within an interaction path of the spectroscopy system 114.

A spectrometer 122 in the spectroscopy system 114 can adjust at least one light property, such as intensity, wavelength, or the like, that is associated with the light signal before the light signal perturbates the representative sample. For example, the spectrometer 122 can modulate the wavelength of the light signal to provide relatively clearer analyte signal and to reduce analytical impedance. The analytical impedance, such as particulates, an interferent, or the like, can be removed from the representative sample using the first separation apparatus 402a. After the light signal perturbates the representative sample, a detector 124 in the spectroscopy system 114 can receive the light signal and can convert the light signal into electric signals (e.g., the electric signals 125 of FIG. 1). The electric signals may be transmitted to a computing device (e.g., the computing device 126 of FIG. 1). Additionally or alternatively, the electric signals can be transmitted to a controller 128 that can be positioned in the spectroscopy system 114 or another location in the monitoring system 400. In some examples, the detector 124 can be tuned for wavelength sensitivity or wavelength amplification based on the light source 118.

The controller 128 can implement feedback control between the detector 124, the spectrometer 122, the light source 118, or a combination thereof. The feedback control can be associated with an optimization criterion. Examples of the optimization criteria can include dynamically adjusted sensitivity with respect to components of the representative sample, net analyte signal, signal-to-noise ratio, or the like. In some examples, the controller 128 may be communicatively coupled to the sampling unit 108. For example, the controller 128 can be communicatively coupled to the treatment system 112 to use the feedback control to adjust the physical property of the representative sample.

The monitoring system 400 can include the waste handling system 130 for removing the representative sample from the spectroscopy system 114. The waste handling system 130 can handle the waste in accordance with regional laws or regulations. Additionally, the waste handling system 130 can remove chemical consumables, such as the indicator 410, preparation reagents, or the like, that are used in the monitoring system 400. Additional examples of the chemical consumables can include matrix normalization components, such as nitrogen, argon, helium, or the like. Chemical waste can include the representative sample, the chemical consumables, or a combination thereof. Methods for handling the chemical waste can include reinjecting the chemical waste into the fluid flow, venting the chemical waste to atmosphere, storing the chemical waste, or the like.

Prior to handling the chemical waste, the waste handling system can receive a chemical analysis of the chemical waste. The chemical analysis may include the spectroscopic analysis and can specify suitability of the chemical waste for waste handling methods. Examples of the suitability can include suitability for flaring, venting, storage, reinjection, recycling, or a combination thereof. For example, after the chemical waste is deemed suitable for flaring, a venting unit 412 in the waste handling system 130 can flare the chemical waste, such as using an open flame. After the chemical waste is deemed suitable for venting, the venting unit 412 can vent the chemical waste to the atmosphere.

Based on the suitability of the chemical waste with respect to reinjection, the waste handling system 130 can determine whether to use a reinjection unit 414 to reinject the chemical waste into the fluid flow. The reinjection unit 414 may include a treatment process to adjust one or more physical properties of the chemical waste to match a fluid flow condition with respect to the fluid flow in the pipeline. For example, the flash system 406 may lower the pressure of the representative sample to change the representative sample from the liquid phase to the gas phase. Prior to reinjecting the chemical into the fluid flow, a treatment processor can increase the pressure of the chemical waste to match or exceed a pressure of the fluid flow. Additionally, the waste handling system can collect the chemical waste using a capturing unit 416 to obtain a sufficient volume of the chemical waste prior to reinjecting the chemical waste.

The waste handling system 130 additionally can separate the chemical waste into individual components to simplify handling or transportation of the chemical waste. For example, the chemical waste can be separated into a first component 418a, a second component 418b, and a third component 418c. The first component 418a can be optionally pumped into a waste container, such as a tank, by the capturing unit 416 for storage prior to waste disposal. The second component 418b may optionally be emitted to the atmosphere after being determined to be safe to vent. The third component 418c may be optionally injected into the fluid flow by the reinjection unit 414 after the reinjection unit 414 adjusts the physical property of the third component 418c to match the fluid flow condition. The first component 418a, the second component 418b, and the third component 418c may be treated in any suitable combination thereof.

Additionally or alternatively, the individual components can be categorized as a hazardous component or as a benign component. The hazardous component may be a chemical compound that is hazardous to human health (i.e., toxic), harmful to ecosystems, or has regulations pertaining to environmental release. Examples of the hazardous component can include carcinogens, teratogens, or other suitable chemicals that can endanger human health. The benign component may be relatively safe to release to the atmosphere or to a surrounding environment.

A second separation apparatus 402b can be included in the waste handling system 130 to separate the chemical waste into the individual components. Separation methods implemented by the first separation apparatus 402a can be used by the second separation apparatus 402b and vice versa. In some examples, the second separation apparatus 402b can involve reactive filtering. For example, carbon dioxide can be removed from the chemical waste by reactive filtering with barium oxide, calcium oxide, or another suitable metal oxide or reactive material. By separating the chemical waste into the individual components, the hazardous component can be handled separately from the benign component. For example, the hazardous component can be captured, while the benign component may be vented to the surrounding environment, reinjected into the fluid flow, or captured separately from the hazardous component.

Prior to capturing or releasing the hazardous component, the waste handling system 130 may neutralize the hazardous component. For example, the waste handling system 130 can injection oxygen over a catalyst to neutralize combustible components. Additionally, the catalyst, such copper oxide or other suitable metal oxides, may be regenerated in situ. Alternatively, the waste handling system 130 may treat the hazardous component with an oxidant, such as ozone. Additives, such as plasma, arcs, or heat, can be implemented by the waste handling system 130 in conjunction with the oxidant for reactive neutralization. Alternatively, the waste handling system 130 can directly implement the additives with respect to the hazardous component.

After being separated from the chemical waste, the hazardous component can be captured using the capturing unit 416 for storage locally. Additionally or alternatively, the hazardous component can be stored temporarily before transportation for waste disposal. An interlocking system can be implemented in the waste handling system 130 to store the chemical waste. In some examples, the hazardous component can be stored as a gas in a pressurized container. Alternatively, the hazardous component can be stored by trapping the hazardous component in a fluid medium. The fluid medium can be inert with respect to the hazardous component and can enable a lower likelihood of explosion compared to storing the hazardous component in the pressurized container.

A disposal assay can be determined by analyzing the representative sample. The disposal assay can indicate one or more steps associated with the waste disposal. For example, the disposal assay may trigger alarms at a worksite related to the pipeline. Additionally or alternatively, the disposal assay can trigger a remote notification for informing an operator regarding precautions to implement prior to arriving at the worksite or prior to the waste disposal. A list of HSE (health, safety, and environmental) concerns may be transmitted based on analyzing the representative sample.

Although FIG. 4 shows a certain number and arrangement of components, this example is intended to be illustrative and non-limiting. Other examples may include more components, fewer components, different components, or a different arrangement of the components shown in FIG. 4. For instance, the light source 118 and the spectrometer 122 may be combined into a single housing, as described below for FIG. 6. Any suitable arrangement of the depicted components is contemplated herein.

Figure 5:
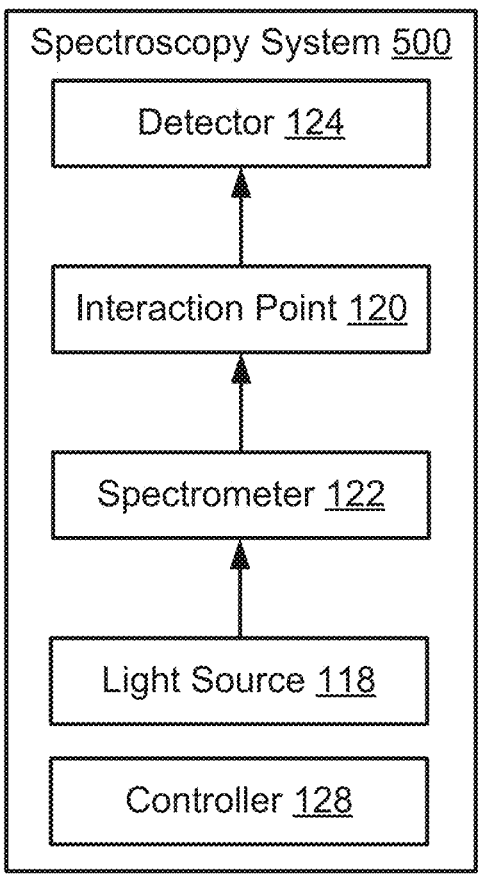
FIG. 5 is a block diagram of a spectroscopy system associated with a monitoring system for a pipeline according to one example of the present disclosure.

FIG. 4 depicts one example of a spectroscopy system that can be used in the monitoring system. Spectroscopy systems with other arrangements and components may also be used. An arrangement of the components in the spectroscopy system 114 can be adjusted to tune a chemical analysis of the fluid flow 106. For example, FIG. 5 is a block diagram of a spectroscopy system 500 associated with a monitoring system for a pipeline (e.g., the pipeline 100 of FIG. 1) according to one example of the present disclosure. The monitoring system can be the monitoring system 400 of FIG. 4 and can be used to monitor a CCUS pipeline.

After obtaining the representative sample, the spectroscopy system 500 can be used to chemically analyze the representative sample to identify components of the representative sample. In some examples, the spectroscopy system 500 can include a detector 124, an interaction point 120, a spectrometer 122, and a light source 118. More generally, the light source 118 can represent a sample perturbation source, and the spectrometer 122 can represent a means of measuring a magnitude of an effect of a perturbation as a function of a change of a perturbation property. Additionally, the spectroscopy system 114 may include a controller 128 to provide feedback control with respect to preparing the representative sample prior to being analyzed by the spectroscopy system 500. The controller 128 may be communicatively coupled to any component in the spectroscopy system 500 or any combination of components in the spectroscopy system 500. For example, the controller 128 may be communicatively coupled to the light source 118 to modulate a light property of the light signal outputted by the light source 118.

After receiving the representative sample from the sampling unit 108, the light source 118 in the spectroscopy system 500 can output the light signal to perturbate the representative sample. The light signal can pass through the spectrometer 122, which can adjust the wavelength of the light signal prior to the light signal reaching the representative sample. After exiting the spectrometer 122, the light signal can interact with the interaction point 120. By interacting with the light signal, the interaction point 120 can adjust a pathlength of the light signal to tune the light signal. For example, a mirror in the interaction point 120 can be adjusted with respect to an angle to reflect the light signal. In some examples, the light signal may not be adjusted by the spectrometer 122 or the interaction point 120 prior to reaching the representative sample.

Figure 6:
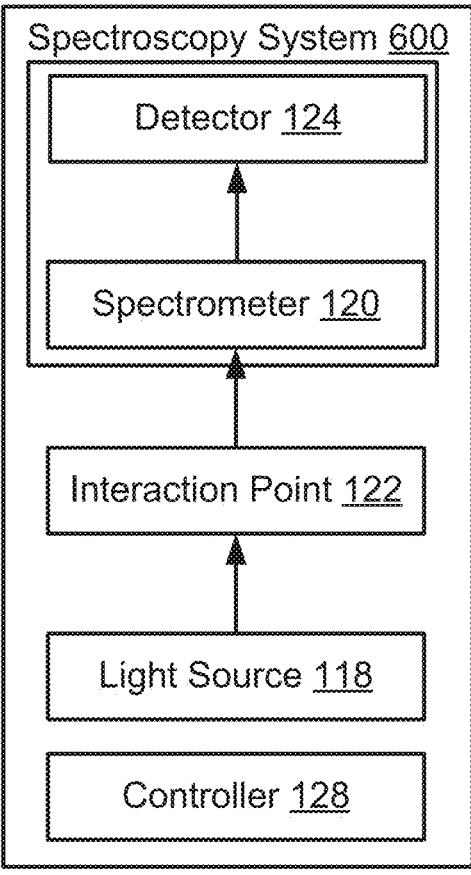
FIG. 6 is a block diagram of a spectroscopy system associated with a monitoring system for a pipeline that combines a detector and a spectrometer according to one example of the present disclosure.

Another example of a spectroscopy system in the monitoring system 400 is depicted in FIG. 6, which is a block diagram of a spectroscopy system 600 that combines the detector 124 and the spectrometer 122 according to one example of the present disclosure. The spectroscopy system 600 can receive the representative sample from the sampling unit 108 to perform the chemical analysis with respect to the representative sample. The chemical analysis can be used to identify components in the representative sample.

Analyzing the representative sample can involve perturbating the representative sample. The light source 118 in the spectroscopy system 600 can generate a light signal to perturbate the representative sample. After being outputted by the light source 118, the light signal can interact with the interaction point 120. By interacting with the light signal, the interaction point 120 can adjust a pathlength of the light signal. From the interaction point 120, the light signal can be received by the spectrometer 122. In some examples, the spectrometer 122 and the detector 124 can be combined as a single component that performs functions of the spectrometer 122 and the detector 124. Additionally, the spectrometer 122 and the detector 124 may be coupled together in a single housing. The spectrometer 122 can adjust a light property, such as wavelength or the like, of the light signal before the light signal perturbates the representative sample. The detector 124 can convert the light signal into electric signals (e.g., the electric signals 125 of FIG. 1) after the light signal has been adjusted by the spectrometer 122 and has passed through the representative sample. The electric signals can be transmitted to a computing device (e.g., the computing device 126 of FIG. 1) for further analysis. Additionally or alternatively, the electric signals may be transmitted to the controller 128 to implement feedback control in the spectroscopy system 600.

Figure 7:
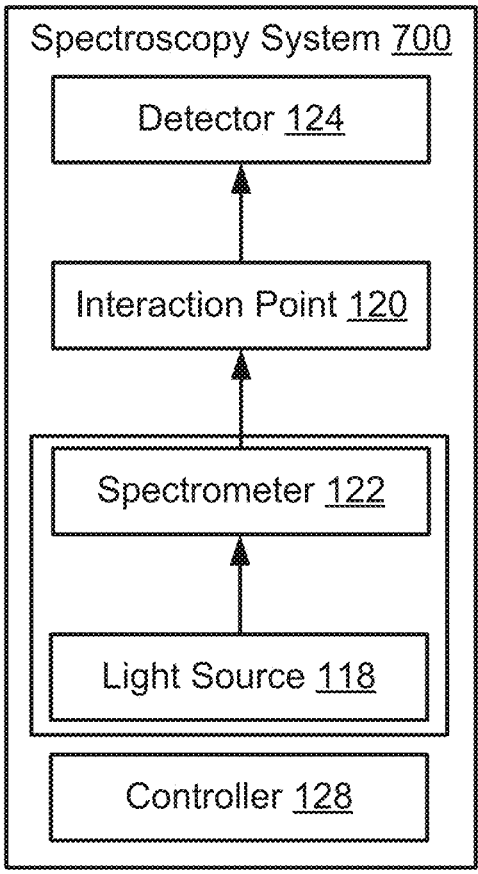
FIG. 7 is a block diagram of a spectroscopy system associated with a monitoring system for a pipeline that combines a light source and a spectrometer according to one example of the present disclosure.

Yet another example of a spectroscopy system in the monitoring system is depicted in FIG. 7, which depicts a block diagram of a spectroscopy system 700 that combines the light source 118 and the spectrometer 122 according to one example of the present disclosure. The monitoring system 400 can be implemented in a pipeline to monitor a fluid flow (e.g. the fluid flow 106 of FIG. 1) of the pipeline. The pipeline may be a CCUS pipeline. In some examples, the monitoring system 400 may be positioned downstream from a turbulence generator (e.g., the turbulence generator 110 of FIG. 1). The detector 124, interaction point 120, spectrometer 122, and perturbation source (e.g., the light source 118) may be combined in any suitable combination and placed in any order.

A representative sample (e.g., the representative sample 104 of FIG. 1) can be collected from the fluid flow of the pipeline by the sampling unit 108. The sampling unit 108 may collect the representative sample after the turbulence generator mixes the fluid flow. A treatment process for the representative sample can be implemented by the sampling unit 108 to adjust a physical property, such as temperature, concentration, or the like, of the representative sample. The spectroscopy system 114 can receive the representative sample from the sampling unit 108 before chemically analyzing the representative sample. By analyzing the representative sample, the spectroscopy system 700 can identify components in the representative sample.

To analyze the representative sample, the spectroscopy system 700 can include the light source 118 to output a light signal that perturbates the representative sample. A light property of the light signal can be adjusted by a combination of the light source 118 with the spectrometer 122 in the spectroscopy system 700 prior to the light signal reaching the interaction point 120. In some examples, the combination of the light source 118 with the spectrometer 122 can be referred to as a laser. Examples of the light property can include wavelength, intensity, or the like with respect to the light signal.

The interaction point 120 can adjust a pathlength of the light signal to tune the light signal. The detector 124 can receive the light signal from the interaction point 120 after the light signal interacts with the interaction point 120. After receiving the light signal, the detector 124 can convert the light signal into electric signals (e.g., the electric signals 125 of FIG. 1). The electric signals can be transmitted to a computing device (e.g., the computing device 126 of FIG. 1) for further analysis. Additionally or alternatively, the electric signals may be transmitted to the controller 128 to implement feedback control in the spectroscopy system 700.

Figure 8:
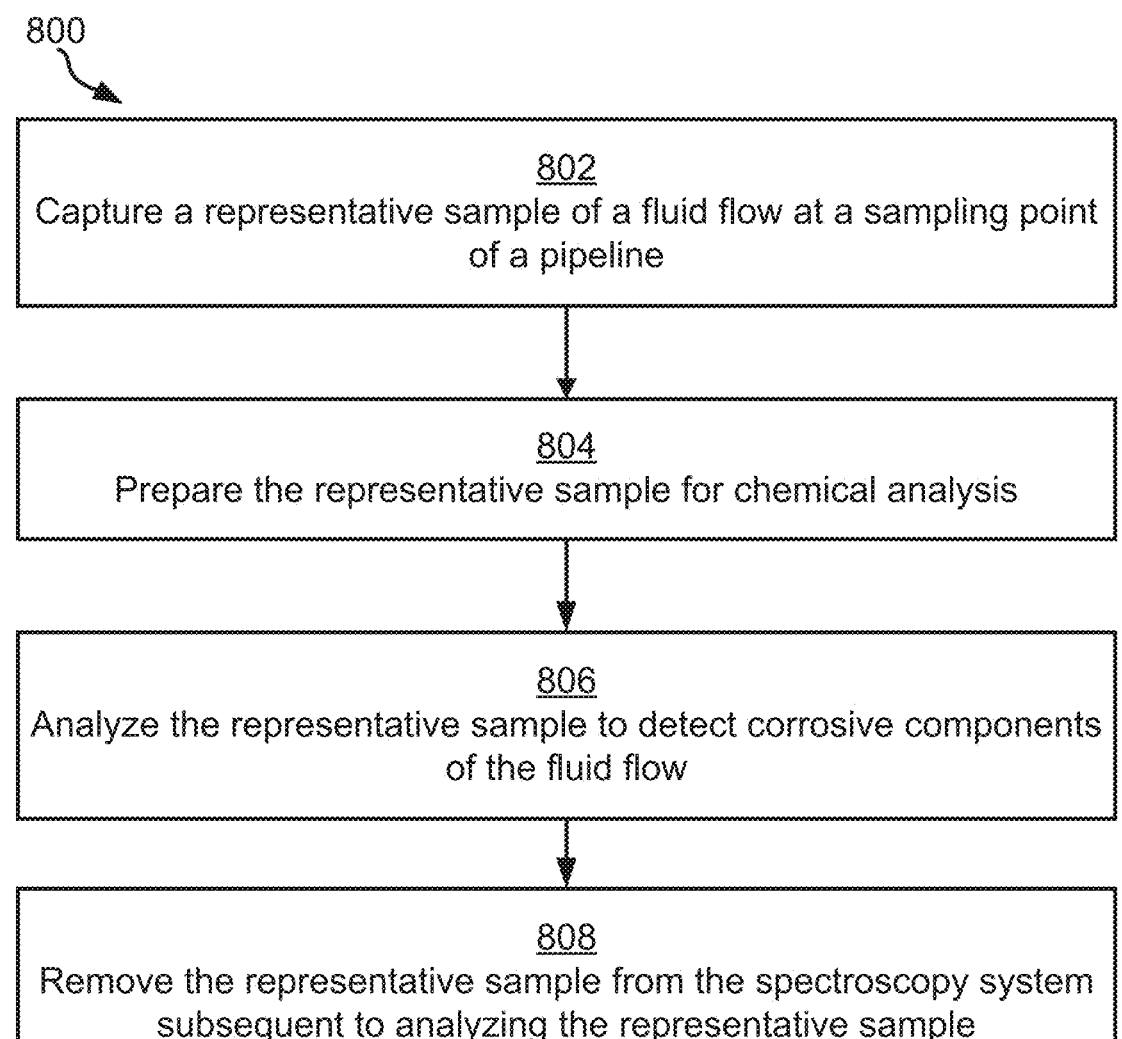
FIG. 8 is a flowchart of a process for monitoring a pipeline using a monitoring system according to one example of the present disclosure.

FIG. 8 is a flowchart of a process 800 to monitor a pipeline 100 using a monitoring system 102 according to one example of the present disclosure. While FIG. 8 depicts a certain sequence of steps for illustrative purposes, other examples can involve more steps, fewer steps different steps, or a different order of steps depicted in FIG. 8. The process 800 is described with references to components shown in FIG. 1.

At block 802, a sampling unit 108 in the monitoring system 102 captures a representative sample 104 of a fluid flow 106 at a sampling point 111 of the pipeline 100. The sampling unit 108 can use a capillary tube or other suitable collection device at the sampling point 111 to capture the representative sample 104. A sensor 116 associated with the sampling unit 108 can obtain data related to the fluid flow. Examples of the data can include pressure data, temperature data, concentration data, or the like.

At block 804, the sampling unit 108 prepares the representative sample for chemical analysis. After collecting the representative sample 104, the sampling unit 108 can use a treatment system 112 to prepare the representative sample 104 for the chemical analysis by a spectroscopy system 114. The treatment system 112 can separate the representative sample 104 into components, which can include corrosive components, hazardous components, or benign components. In some examples, the treatment system 112 may inject an indicator (e.g., the indicator 410 of FIG. 4) into the representative sample 104 to identify the components. In some examples, the indicator can identify active corrosion or potential corrosion in the pipeline 100.

At block 806, the spectroscopy system 114 in the monitoring system 102 analyzes the representative sample 104 to detect the corrosive components of the fluid flow 106. The corrosive components can cause corrosion in the pipeline 100, which can lead to further deterioration, such as cracking or bursting, in the pipeline 100. To identify the components in the representative sample 104, the spectroscopy system 114 can output a light signal using a light source 118. The light source 118 can be adjusted by a spectrometer 122, an interaction point 120, or a combination thereof. The spectrometer 122 can adjust a light property, such as intensity or the like, associated with the light signal. The interaction point 120 can adjust a pathlength for the light signal by changing an angle of an interaction path in the interaction point 120. Additionally or alternatively, the pathlength can be adjusted by changing a window or a mirror positioned in the interaction point 120 to adjust a number of internal reflections in the interaction point 120.

After the light signal has been adjusted, the representative sample 104 can be perturbed by the light signal. After passing through the representative sample 104, the light signal can be received by the detector 124 to convert the light signal to electric signals 125. In some examples, the electric signals 125 may be converted by a converter external to the monitoring system 102 from analog signals to digital signals. The electric signals 125 can be transmitted to a computing device 126 for further analysis. For example, the computing device 126 can output a spectroscopy graph using the electric signals from the detector 124. A user can identify the components of the representative sample 104 using the spectroscopy graph. Additionally or alternatively, the computing device 126 may identify the components of the representative sample 104 automatically based on the electric signals.

At block 808, a waste handling system 130 in the monitoring system 102 removes the representative sample 104 from the spectroscopy system 114 subsequent to analyzing the representative sample 104. In addition to the representative sample 104, the waste handling system may remove chemical consumables from the spectroscopy system 114, the sampling unit 108, or a combination thereof. The representative sample 104, the chemical consumables, or a combination thereof can be considered chemical waste. The waste handling system 130 can apply one or more waste handling methods to remove the chemical waste. For example, the waste handling system can store the chemical waste for later disposal. Additionally or alternatively, the waste handling system may remediate the chemical waste prior to releasing the chemical waste to a surround environment.

FIG. 9 is a flowchart of a process 900 for chemically analyzing a representative sample from a pipeline using a monitoring system according to one example of the present disclosure. While FIG. 9 depicts a certain sequence of steps for illustrative purposes, other examples can involve more steps, fewer steps different steps, or a different order of steps depicted in FIG. 9. The process 900 is described with references to components shown in FIG. 1.

At block 902, a light source 118 in a spectroscopy system 114 of the monitoring system 102 outputs a light signal to perturbate the representative sample 104. The light signal can be adjusted by components in the spectroscopy system 114 prior to perturbating the representative sample 104. Additionally or alternatively, the light source 118 may adjust a light property of the light signal. Examples of the light property can include intensity, frequency, or the like. In some examples, the light source 118 can adjust the light property after receiving a first command from a controller 128. The controller may implement feedback control to adjust the components in the spectroscopy system 114.

At block 904, an interaction point 120 in the spectroscopy system 114 adjusts a pathlength of the light signal prior to the light signal perturbating the representative sample. The interaction point 120, such as an optical cell, can adjust the pathlength by changing a reflector, such as a mirror or a window, in the interaction point 120. For example, an angle of the mirror or the window may be adjusted to change a number of internal reflections of the light signal within the interaction point 120. In some examples, the interaction point 120 may be adjusted to include more reflectors or less reflectors to adjust the pathlength of the light signal.

At block 906, a spectrometer 122 in the spectroscopy system 114 adjusts the light property for the light signal prior to the light signal perturbating the representative sample. For example, a resolution of the light signal can be adjusted based on the components being analyzed in the representative sample 104, a background composition, or a combination thereof. In some examples, adjusting the light property can decrease signals from interferents that can cause inaccurate measurements.

At block 908, a detector 124 in the spectroscopy system 114 converts the light signal to electric signals 125 subsequent to perturbating the representative sample 104. After the light signal is adjusted by the spectrometer 122 or the interaction point 120, the light signal can pass through the representative sample 104 to perturbate the representative sample 104. The light signal that has passed through the representative sample 104 can be converted by the detector 124 to the electric signals 125. The electric signals 125 can be transmitted to a computing device 126 that is communicatively coupled to the monitoring system 102. Additionally or alternatively, the electric signals 125 may be transmitted to the controller 128 in the monitoring system 102. In some examples, a converter may receive the electric signals from the detector 124 to convert the electric signals from analog signals to digital signals.

At block 910, the controller 128 in the spectroscopy system 114 adjusts a sampling condition for the sampling unit 108 after receiving the electric signals 125 from the detector 124. The sampling condition can include pressure, temperature, concentration, or the like with respect to the representative sample 104. For example, the controller 128 can use the electric signals 125 to determine that a concentration for a component in the representative sample 104 is above a predefined threshold. To lower the concentration of the component, the controller 128 can transmit a second command to the sampling unit 108 to dilute the representative sample 104. In some examples, adjustments to the sampling condition or to the components of the spectroscopy system 114 may be based on a communication transmitted from the computing device 126 to the controller 128.

In some aspects, a monitoring system, a method, and a pipeline system for a monitoring system for monitoring a pipeline are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a monitoring system comprising: a sampling unit comprising a sampling point for capturing a representative sample of a fluid flow in a pipeline; a spectroscopy system configured to chemically analyze the representative sample with respect to components of the fluid flow, the spectroscopy system being configured to detect a corrosive component of the fluid flow; and a waste handling system for removing the representative sample from the spectroscopy system.

Example 2 is the monitoring system of example(s) 1, further comprising: a turbulence generator coupled to the pipeline upstream from the sampling point, wherein the turbulence generator is configured to generate turbulence from a pressure change within the pipeline to mix the fluid flow.

Example 3 is the monitoring system of example(s) 1-2, wherein the turbulence generator further comprises: a side arm coupled to the pipeline and defining a flow path for the fluid flow external to the pipeline, wherein the side arm defines (i) a first opening at a first point of the pipeline and (ii) a second opening at a second point of the pipeline downstream from the first point, wherein a portion of the fluid flow is directed into the flow path of the side arm through the first opening and exits the flow path through the second opening for causing a pressure drop within the pipeline.

Example 4 is the monitoring system of example(s) 1-3, wherein the turbulence generator further comprises: a plurality of fins configured to be inserted into the pipeline for generating eddies in the fluid flow to mix the fluid flow.

Example 5 is the monitoring system of example(s) 1-4, wherein the pipeline further comprises: a recess defined by an exterior of the pipeline, wherein the turbulence generator is configured to retract into the recess for removing the turbulence generator from contacting the fluid flow.

Example 6 is the monitoring system of example(s) 1-5, wherein the sampling unit further comprises: a separation apparatus configured to remove at least one component from the representative sample; and a dilution unit configured to dilute the representative sample with an inert compound.

Example 7 is the monitoring system of example(s) 1-6, wherein the waste handling system is configured to receive the representative sample from the monitoring system, and wherein the waste handling system further comprises: a separation apparatus configured to separate a component of the representative sample from the representative sample; and a capturing unit configured to store the component.

Example 8 is the monitoring system of example(s) 1-7, wherein the component is a first component, wherein the separation apparatus is configured to separate a second component and a third component from the representative sample, and wherein the waste handling system further comprises: a venting unit configured to vent the second component of the representative sample; and a reinjection unit configured to adjust at least one physical property of the third component to match at least one fluid flow condition in the pipeline and to inject the third component with the adjusted physical property into the fluid flow of the pipeline.

Example 9 is a method comprising: capturing, via a sampling unit in a monitoring system of a pipeline, a representative sample of a fluid flow at a sampling point of the pipeline; preparing, via the sampling unit, the representative sample for chemical analysis; analyzing, via a spectroscopy system in the monitoring system, the representative sample to detect corrosive components of the fluid flow; and removing, via a waste handling system in the monitoring system, the representative sample from the spectroscopy system subsequent to analyzing the representative sample.

Example 10 is the method of example(s) 9, further comprising, prior to capturing the representative sample: generating a pressure change to mix the fluid flow by using a turbulence generator coupled to the pipeline upstream from the sampling point.

Example 11 is the method of example(s) 9-10, wherein a side arm coupled to an exterior of the pipeline defines a flow path for the fluid flow in the pipeline, wherein generating the pressure change to mix the fluid flow further comprises: directing a portion of the fluid flow into the flow path of the side arm through a first opening defined by the side arm such that the portion of the fluid flow rejoins the fluid flow by exiting the flow path through a second opening defined by the side arm, wherein the first opening is coupled to a first point of the pipeline and the second opening is coupled to a second point of the pipeline downstream from the first point; and generating a pressure drop of the fluid flow within the pipeline via the portion of the fluid flow exiting the side arm.

Example 12 is the method of example(s) 9-11, wherein the turbulence generator comprises a plurality of fins, and wherein generating the pressure change to mix the fluid flow further comprises: inserting the plurality of fins into the pipeline; and generating, by the plurality of fins, eddies in the fluid flow.

Example 13 is the method of example(s) 9-12, further comprising: retracting the turbulence generator into a recess defined by an exterior of the pipeline.

Example 14 is the method of example(s) 9-13, wherein preparing the representative sample for the chemical analysis further comprises: removing, using a separation apparatus, at least one component from the representative sample; and diluting, using a dilution unit, the representative sample using an inert compound.

Example 15 is the method of example(s) 9-14, wherein removing the representative sample further comprises: receiving, from the monitoring system, the representative sample subsequent to chemical analysis; separating, using a separation apparatus in the waste handling system, a first component of the representative sample from the representative sample; and pumping, using a capturing unit in the waste handling system, the first component into a container for storing the first component prior to disposal of the first component.

Example 16 is the method of example(s) 9-15, further comprising: separating, by the separation apparatus, a second component and a third component from the representative sample; emitting, using a venting unit in the waste handling system, the second component of the representative sample into atmosphere; adjusting, by a reinjection unit in the waste handling system, at least one physical property of the third component to match at least one fluid flow condition of fluid flow in the pipeline; and injecting, using the reinjection unit in the waste handling system, the third component of the representative sample into the fluid flow subsequent to adjusting the at least one physical property.

Example 17 is a pipeline system comprising: a pipeline comprising a fluid flow; and a monitoring system comprising: a sampling unit comprising a sampling point configured to capture a representative sample of the fluid flow from the pipeline; a spectroscopy system configured to chemically analyze the representative sample with respect to components of the fluid flow, the spectroscopy system being configured to detect a corrosive component of the fluid flow; and a waste handling system configured to remove the representative sample from the spectroscopy system.

Example 18 is the pipeline system of example(s) 17, wherein the monitoring system further comprises: a turbulence generator coupled to the pipeline upstream from the sampling point, wherein the turbulence generator is configured to generate turbulence from a pressure change within the pipeline to mix the fluid flow.

Example 19 is the pipeline system of example(s) 17-18, wherein the turbulence generator further comprises: a side arm coupled to the pipeline and defining a flow path for the fluid flow external to the pipeline, wherein the side arm defines (i) a first opening at a first point of the pipeline and (ii) a second opening at a second point of the pipeline downstream from the first point, wherein a portion of the fluid flow is directed into the flow path of the side arm through the first opening and exits the flow path through the second opening for causing a pressure drop within the pipeline.

Example 20 is the pipeline system of example(s) 17-19, wherein the turbulence generator further comprises: a plurality of fins configured to be inserted into the pipeline for generating eddies in the fluid flow to mix the fluid flow.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A monitoring system comprising:
a sampling unit comprising a sampling point configured to capture a representative sample of a fluid flow in a pipeline, the fluid flow homogenized prior to the sampling unit capturing the representative sample;

a spectroscopy system configured to chemically analyze the representative sample with respect to components of the fluid flow, the spectroscopy system being configured to detect a corrosive component of the fluid flow; and
a waste handling system configured to remove the representative sample from the spectroscopy system, the waste handling system comprising:
a separation apparatus configured to separate a component of the representative sample from the representative sample; and
a capturing unit configured to store the component.
2. The monitoring system of claim 1, further comprising:
a turbulence generator coupled to the pipeline upstream from the sampling point, wherein the turbulence generator is configured to generate turbulence from a pressure change within the pipeline to mix the fluid flow.
3. The monitoring system of claim 2, wherein the turbulence generator further comprises:
a side arm coupled to the pipeline and defining a flow path for the fluid flow external to the pipeline, wherein the side arm defines (i) a first opening at a first point of the pipeline and (ii) a second opening at a second point of the pipeline downstream from the first point, wherein a portion of the fluid flow is directed into the flow path of the side arm through the first opening and exits the flow path through the second opening for causing a pressure drop within the pipeline.
4. The monitoring system of claim 2, wherein the turbulence generator further comprises:
a plurality of fins configured to be inserted into the pipeline for generating eddies in the fluid flow to mix the fluid flow.
5. The monitoring system of claim 2, wherein the pipeline further comprises:
a recess defined by an exterior of the pipeline, wherein the turbulence generator is configured to retract into the recess to remove the turbulence generator from contacting the fluid flow.
6. The monitoring system of claim 1, wherein the separation apparatus of the waste handling system is a first separation apparatus, and wherein the sampling unit further comprises:
a second separation apparatus configured to remove at least one component from the representative sample; and
a dilution unit configured to dilute the representative sample with an inert compound.
7. The monitoring system of claim 1, wherein the component is a first component, wherein the separation apparatus is configured to separate a second component and a third component from the representative sample, and wherein the waste handling system further comprises:
a venting unit configured to vent the second component of the representative sample; and
a reinjection unit configured to adjust at least one physical property of the third component to match at least one fluid flow condition in the pipeline and to inject the third component with the adjusted physical property into the fluid flow of the pipeline.
8. A method comprising:
capturing, via a sampling unit in a monitoring system of a pipeline, a representative sample of a fluid flow at a sampling point of the pipeline, the fluid flow homogenized prior to the sampling unit capturing the representative sample;

preparing, via the sampling unit, the representative sample for chemical analysis;

analyzing, via a spectroscopy system in the monitoring system, the representative sample to detect corrosive components of the fluid flow; and removing, via a waste handling system in the monitoring system, the representative sample from the spectroscopy system subsequent to analyzing the representative sample, wherein removing the representative sample further comprises:

separating, using a separation apparatus of the waste handling system, a component of the representative sample from the representative sample; and storing, using a capturing unit of the waste handling system, the component prior to disposal.

9. The method of claim 8, further comprising, prior to capturing the representative sample:

generating a pressure change to mix the fluid flow by using a turbulence generator coupled to the pipeline upstream from the sampling point.

10. The method of claim 9, wherein a side arm coupled to an exterior of the pipeline defines a flow path for the fluid flow in the pipeline, wherein generating the pressure change to mix the fluid flow further comprises:

directing a portion of the fluid flow into the flow path of the side arm through a first opening defined by the side arm such that the portion of the fluid flow rejoins the fluid flow by exiting the flow path through a second opening defined by the side arm, wherein the first opening is coupled to a first point of the pipeline and the second opening is coupled to a second point of the pipeline downstream from the first point; and generating a pressure drop of the fluid flow within the pipeline via the portion of the fluid flow exiting the side arm.

11. The method of claim 9, wherein the turbulence generator comprises a plurality of fins, and wherein generating the pressure change to mix the fluid flow further comprises:

inserting the plurality of fins into the pipeline; and generating, by the plurality of fins, eddies in the fluid flow.

12. The method of claim 9, further comprising:

retracting the turbulence generator into a recess defined by an exterior of the pipeline.

13. The method of claim 8, wherein the separation apparatus of the waste handling system is a first separation apparatus, and wherein preparing the representative sample for the chemical analysis further comprises:

removing, using a second separation apparatus, at least one component from the representative sample; and diluting, using a dilution unit, the representative sample using an inert compound.

14. The method of claim 8, wherein removing the representative sample further comprises:

pumping, using the capturing unit of the waste handling system, the component into a container for storing the component prior to the disposal of the component.

15. The method of claim 8, wherein the component is a first component, and wherein the method further comprises:

separating, by the separation apparatus, a second component and a third component from the representative sample;

emitting, using a venting unit in the waste handling system, the second component of the representative sample into atmosphere;

adjusting, by a reinjection unit in the waste handling system, at least one physical property of the third component to match at least one fluid flow condition of fluid flow in the pipeline; and injecting, using the reinjection unit in the waste handling system, the third component of the representative sample into the fluid flow subsequent to adjusting the at least one physical property.

16. A pipeline system comprising:

a pipeline comprising a fluid flow; and a monitoring system comprising:

a sampling unit comprising a sampling point configured to capture a representative sample of the fluid flow from the pipeline, the fluid flow homogenized prior to the sampling unit capturing the representative sample;

a spectroscopy system configured to chemically analyze the representative sample with respect to components of the fluid flow, the spectroscopy system being configured to detect a corrosive component of the fluid flow; and a waste handling system configured to remove the representative sample from the spectroscopy system, the waste handling system comprising:

a separation apparatus configured to separate a component of the representative sample from the representative sample; and a capturing unit configured to store the component.

17. The pipeline system of claim 16, wherein the monitoring system further comprises:

a turbulence generator coupled to the pipeline upstream from the sampling point, wherein the turbulence generator is configured to generate turbulence from a pressure change within the pipeline to mix the fluid flow.

18. The pipeline system of claim 17, wherein the turbulence generator further comprises:

a side arm coupled to the pipeline and defining a flow path for the fluid flow external to the pipeline, wherein the side arm defines (i) a first opening at a first point of the pipeline and (ii) a second opening at a second point of the pipeline downstream from the first point, wherein a portion of the fluid flow is directed into the flow path of the side arm through the first opening and exits the flow path through the second opening for causing a pressure drop within the pipeline.

19. The pipeline system of claim 17, wherein the turbulence generator further comprises:

a plurality of fins configured to be inserted into the pipeline for generating eddies in the fluid flow to mix the fluid flow.

\* \* \* \* \*